Patented Aug. 25, 1925.

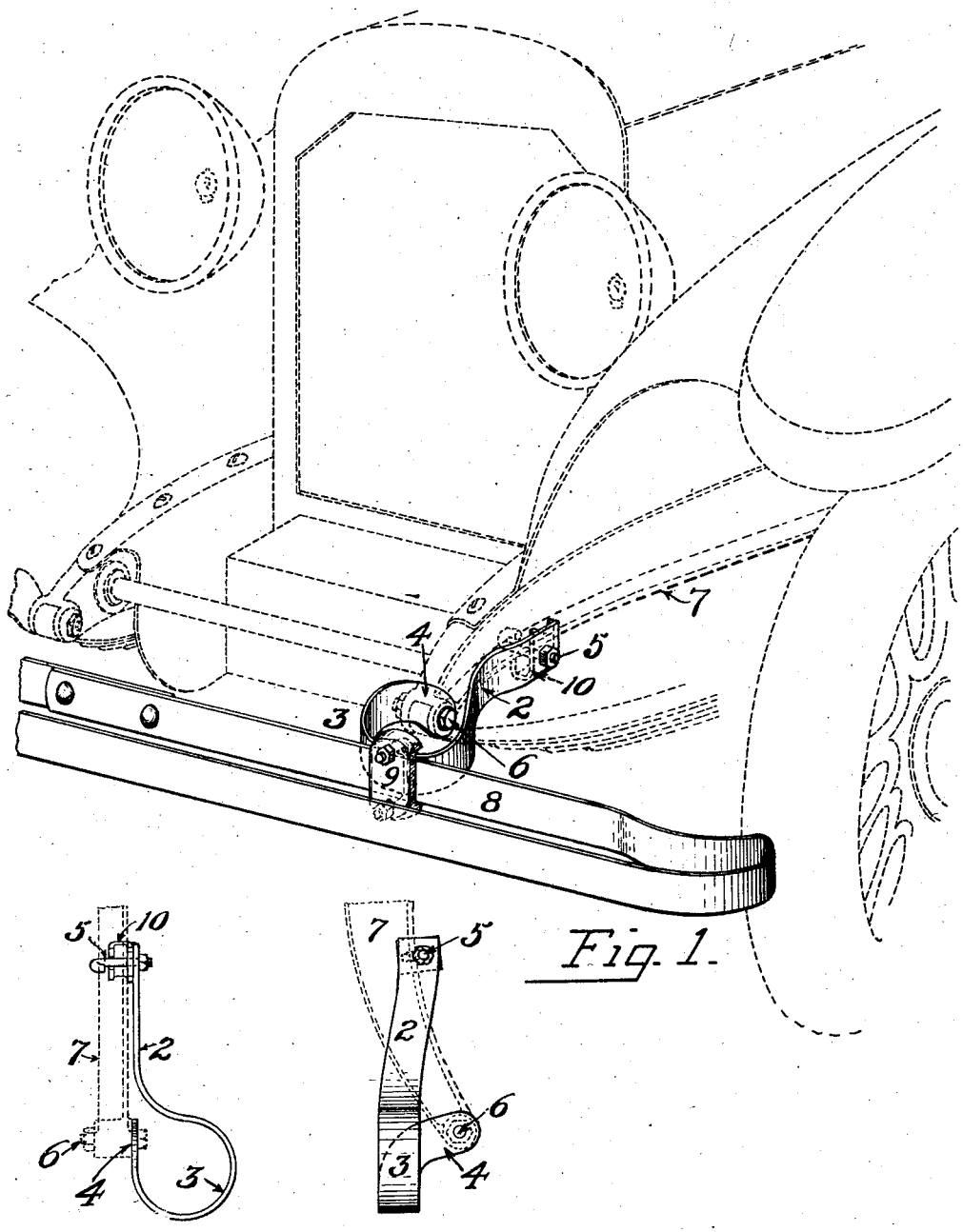

1,551,369

UNITED STATES PATENT OFFICE.

THEODORE M. COX, OF ALBANY, NEW YORK, ASSIGNOR TO THE EATON AXLE & SPRING COMPANY, OF CLEVELAND, OHIO.

BUMPER BRACKET.

Application filed January 7, 1924. Serial No. 684,709.

*To all whom it may concern:*

Be it known that I, THEODORE M. COX, a citizen of the United States of America, residing at Albany, in the county of Albany and State of New York, have invented certain new and useful Improvements in Bumper Brackets, of which the following is a specification.

This invention relates to bumper brackets for use on automobiles. The object of this invention is to provide a bracket which may be easily and securely affixed to the frame of an automobile without the necessity of providing special bolt holes in said frame; and so shaped that when attached to the frame of the type of automobile for which it is designed, the portion thereof to which a bumper bar is to be attached will lie at the desired point in both vertical and horizontal planes.

My improved bumper bracket, and the method in which it is attached to an automobile frame, is illustrated in the accompanying drawings, in which:

Fig. 1 is a perspective view of one of my improved brackets with a portion of a bumper bar attached thereto.

Fig. 2 is a plan view of one of the brackets.

Fig. 3 is a side elevation of Fig. 2.

In the drawings portions of an automobile are indicated by dotted lines.

The same reference characters refer to the same parts throughout the several views.

My improved bumper bracket is designed for use on automobile frames the downwardly curved front ends of the side members of which are provided with bolt holes substantially perpendicular to said side members. These brackets are made right and left hand, and are preferably made from flat bar steel of suitable dimensions.

As is plainly illustrated in the drawings, my improved bumper bracket comprises a formed flat bar, (preferably of steel), the rear portion 2, of which lies substantially parallel with, and is fastened to the frame of an automobile, by means of a hook bolt 5, the hook end of which engages with the lower flange of the side member 7 of said frame. A seating member 10, is interposed between the rear end of the bracket and the side of the frame so as to prevent the bracket from being tipped when the nut on the hook bolt is tightened.

The forward portion of the bar is formed into a loop, 3, by being curved sideways, the curved portion being then reversed and carried around until the end 4 is pointing toward the rear, then bent downward, edgewise, so that a hole formed near the end thereof will be in position to be fastened by the spring bolt 6, to the forward end of the side member 7 of the frame.

A bumper bar 8, of any desired type may then be attached to the curved end of the brackets by means of suitable clamps 9, or in any desired manner.

I claim:

1. A bumper bracket and means for attaching to an automobile frame, comprising an arm formed from a flat bar with a bolt hole in each end thereof, said bar having a loop formed therein and forward of its rear end by bending the bar sideways and curving it back upon itself until the front end points toward and is substantially in line with said rear end, then bending downward edgewise to bring the front end below the plane of the loop; a seating member; a hook bolt adapted to fasten said seating member and the rear end of said formed arm to the side of an automobile frame; and a bolt adapted to fasten the front end of said formed arm against the side of the front end of said automobile frame.

2. A bumper bracket for an automobile, comprising an arm formed from a flat bar with a bolt hole in each end thereof, said bar having a loop formed therein and forward of its rear end by being curved sideways and back upon itself until its front end points toward and substantially in line with the rear part of the bar, then bent downward edgewise until the front end is below the plane of the loop.

In testimony whereof I have affixed my signature.

THEODORE M. COX.